United States Patent
Steely, Jr. et al.

[11] Patent Number: 5,966,737
[45] Date of Patent: Oct. 12, 1999

[54] APPARATUS AND METHOD FOR SERIALIZED SET PREDICTION

[75] Inventors: Simon C. Steely, Jr., Hudson, N.H.; Joseph Dominic Macri, Los Altos, Calif.

[73] Assignee: Compaq Computer, Corp., Houston, Tex.

[21] Appl. No.: 08/971,630

[22] Filed: Nov. 17, 1997

Related U.S. Application Data

[63] Continuation of application No. 08/668,316, Jun. 26, 1996.
[51] Int. Cl.$^6$ ........................................................ G06F 9/38
[52] U.S. Cl. .......................... 711/213; 711/147; 711/136; 711/204
[58] Field of Search .................................. 711/147, 140, 711/204, 213, 136; 395/587

[56] References Cited

U.S. PATENT DOCUMENTS

| | | | |
|---|---|---|---|
| 4,894,772 | 1/1990 | Langendorf | 395/587 |
| 5,509,135 | 4/1996 | Steely, Jr. | 711/147 |

Primary Examiner—Eddie P. Chan
Assistant Examiner—Than V. Nguyen
Attorney, Agent, or Firm—Sharp, Comfort & Merrett, P.C.

[57] ABSTRACT

A prediction mechanism for improving direct-mapped cache performance is shown to include a direct-mapped cache, partitioned into a plurality of pseudo-banks. Prediction means are employed to provide a prediction index which is appended to the cache index to provide the entire address for addressing the direct mapped cache. One embodiment of the prediction means includes a prediction cache which is advantageously larger than the pseudo-banks of the direct-mapped cache and is used to store the prediction index for each cache location. A second embodiment includes a plurality of partial tag stores, each including a predetermined number of tag bits for the data in each bank. A comparison of the tags generates a match in one of the plurality of tag stores, and is used in turn to generate a prediction index. A third embodiment for use with a direct mapped cache divided into two partitions includes a distinguishing bit ram, which is used to provide the bit number of any bit which differs between the tags at the same location in the different banks. The bit number is used in conjunction with a complement signal to provide the prediction index for addressing the direct-mapped cache.

12 Claims, 5 Drawing Sheets

APPARATUS AND METHOD FOR SERIALIZED SET PREDICTION

This is a continuation of copending application(s) Ser. No. 08/668,316 filed on Jun. 26, 1996.

FIELD OF THE INVENTION

This invention relates generally to computer systems and more specifically to the management of cache memory in a computer system.

BACKGROUND OF THE INVENTION

As it is known in the art, computer processing systems include a central processing unit which operates on data stored in a memory. Increased computer processing performance is often achieved by including a smaller, faster memory, called a cache, between the central processing unit and the memory for temporary storage of the memory data. The cache reduces the delay associated with memory access by storing subsets of the memory data that can be quickly read and modified by the central processing unit.

Because computer processes commonly reference memory data in contiguous address space, data is generally obtained from memory in blocks. There are a variety of methods used to map blocks of data from memory into the cache. Two typical cache arrangements include direct mapped caches and set associative caches.

In a conventional direct mapped cache, a block of data from memory is mapped into the cache using the lower bits of the memory address. The lower bits of the memory address are generally called the cache index. The upper bits of the memory address of the data block are generally called the 'tag' of the block. A tag store, which generally has a number of locations equivalent to the number of blocks in the cache, is used to store the tag of each block of data in the cache.

When a processor requires data from the cache it addresses the cache and the tag store and compares the received tag to the upper bits of the memory address of the required data. If the data is not in the cache, the tag does not match the upper address bits and there is a 'miss' in the cache. When there is a 'miss', a memory read is performed to fill the cache with the required data. It is desirable to minimize the number of cache misses in order to avoid the latency incurred by the resulting memory reference.

Direct mapped caches are advantageous because they provide a cache system with minimal address complexity. Because the addressing scheme is straightforward, the cache is able to quickly return data to the central processing unit. However, one drawback of direct mapped caches is that since there is only one possible location in the cache for data having a common cache index, the miss rate is generally high. Thus, although direct mapped caches are able to quickly return data to the central processing unit, the performance is greatly reduced by the high miss rates inherent in the system.

Set associative caches serve to reduce the amount of misses by providing multiple cache locations for memory data having a common cache index. In set-associative caching, the cache is subdivided into a plurality of 'sets'. Each set has an associated tag store for storing the tags of the blocks of data stored in the set. As in direct mapped caching, the location of a particular item within the cache is identified by a cache index derived from the lower bits of the memory address.

When the processor wants to fetch data from the cache, the cache index is used to address each of the sets and their associated tag stores. Each set outputs a data item located at the cache index and the data items sets are generally input to a large multiplexer. The associated tags are each compared against the upper bits of the main memory address to determine if any data item provided by the sets is the required data item. Assuming that the data item to be fetched is in one of the sets of cache, the tag output by the tag store associated with the set matches the upper bits of the memory address. Depending on which tag matched, the appropriate select is provided to the multiplexer and the required data is returned to the processor.

Set-associative cache mapping thus provides improved performance over a direct mapped cache by reducing the frequency of cache misses. However, the amount of time required to perform the set comparison makes the set-associative cache memory system a relatively slow system compared to the direct mapped cache system.

Typically in cache subsystem design a tradeoff is made between the performance advantage provided by the addressing method of direct mapped caches and the reduced miss rate inherent in set-associative caches. It would be desirable to provide a cache subsystem which would be able to utilize the advantages of both the set associative and direct mapped designs with minimal hardware complexity.

SUMMARY OF THE INVENTION

In accordance with the present invention, an apparatus for accessing cache memory includes a memory subsystem including a first memory having a plurality of locations for storing data. The first memory is partitioned into a plurality of banks with each of the plurality of banks being addressable by a first index, where the first index is comprised of a portion of a memory address on said bus. The apparatus further includes prediction means, for providing a prediction index related to the number of banks in the first memory with the prediction index being appended to the first index to form a prediction address for accessing required data in said first memory. With such an arrangement, a plurality of locations are provided for memory data which maps to a common cache index, and thus the cache miss rate is reduced and performance is increased. In addition, providing a prediction index which directly maps to bits of the cache address increases the probability of locating the correct cache data on the first access without the increased propagation delay associated with set-associative caching schemes.

BRIEF DESCRIPTION OF THE DRAWING

The above-mentioned and other features of the invention will now become more apparent by reference to the following description taken in connection with the accompanying drawings in which.

DESCRIPTION OF THE PREFERRED EMBODIMENT

Figure 1:
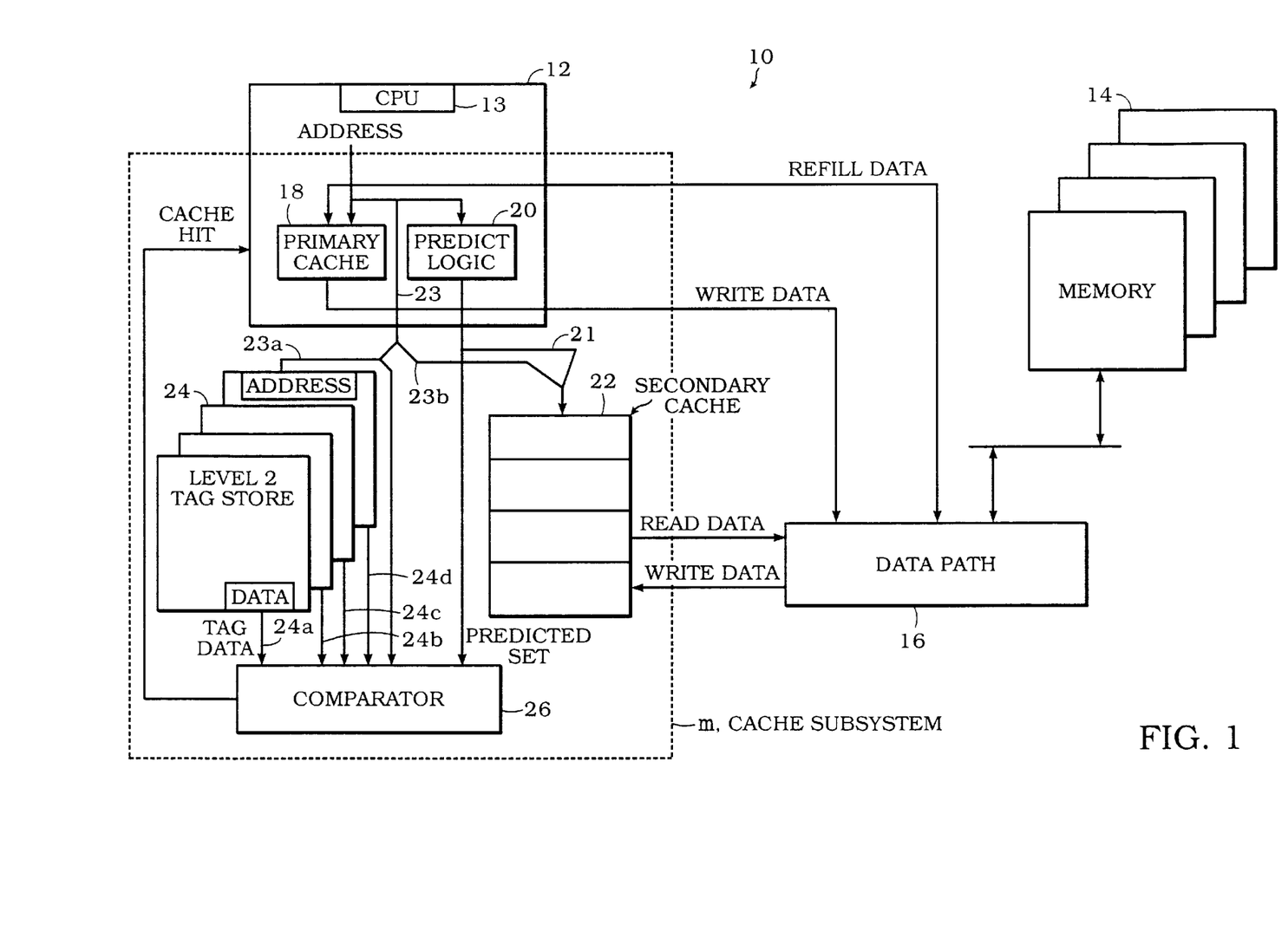
FIG. 1 illustrates a computer system in accordance with the present invention including a cache sub-system having prediction logic.

Referring now to FIG. 1, a computer system 10 is shown to include a central processing system 12 including a central processing unit (CPU) 13 for processing an instruction stream and a cache memory system 11. A memory 14 stores instructions and data which are transferred via a data path 16 to the CPU 13 during the execution of the instruction stream.

The central processing system 12 includes a primary cache 18 which is a small, fast cache for temporary storage of data from memory 14. The central processing system 12 also includes prediction logic 20 for assisting in determining the location of required memory data as will be described.

The central processing system 12 is coupled to a secondary cache 22 and a tag store 24. The secondary cache 22 is relatively larger and slower than the primary cache 18, yet smaller and faster than the memory 14. The secondary cache 22 is a direct-mapped cache which stores a plurality of blocks of data from memory, wherein a block may comprise, for example, 256 bytes of data. The secondary cache 22 is here shown apportioned into 4 pseudo-banks, each having the same number of blocks, although any reasonable number of pseudo-banks could be used.

The tag store 24 has a number of locations corresponding to the number of blocks in the secondary cache 22. The tag store 24 is here shown to be partitioned into a plurality of sub-stores corresponding to the plurality of pseudo-banks of the secondary cache 22. Each location of the tag store 24 stores the upper bits of the memory address of the block at the corresponding pseudo-bank cache location.

During operation of the computer system, blocks of data and instructions are transferred from memory 14 into the secondary cache 22. When the CPU 13 requires data, it provides an address on line 23. The address has an upper address portion on line 23a and a lower address portion on line 23b. The lower portion of the memory address is referred to as the cache index, and is used to access the secondary cache 22. The upper portion of the address on line 23a is referred to as the 'tag' of the data, and is used in conjunction with the tag store 24 to verify that the correct data is retrieved from the secondary cache 22.

When data is written to a newly allocated location in a pseudo-bank of the secondary cache 22, for example during a cache refill operation, the tag on line 23a is written to the corresponding sub-store location of the tag store 24. During a read of data from a location in a pseudo-bank of the secondary cache 22, the tag on line 23a is compared by comparator 26 against the tag stored in the corresponding sub-store location in the tag store 24 to determine if the data received from the cache is the required data.

Typically the drawback of a direct-mapped cache is that there is only one available cache location for mapping a plurality of memory locations having the same cache index. By dividing the direct-mapped secondary cache 22 into a number of pseudo-banks, the number of available cache locations for storing memory data having a common cache index is directly proportional to the number of available pseudo-banks. Thus there is more than one location in which data having a common cache index may be stored.

When data is required from the secondary cache 22, each of the potential locations should be probed to find the data. Performing multiple probes on the secondary cache, however, serves to decrease the performance of the computer system by increasing the latency associated with obtaining data from the secondary cache.

The processor 12 further includes a prediction logic circuit 20 which provides a prediction index on line 21. The prediction index helps to alleviate the performance loss due to multiple probes by increasing the probability that the first cache location probed is the cache location which contains the required data.

Figure 2:
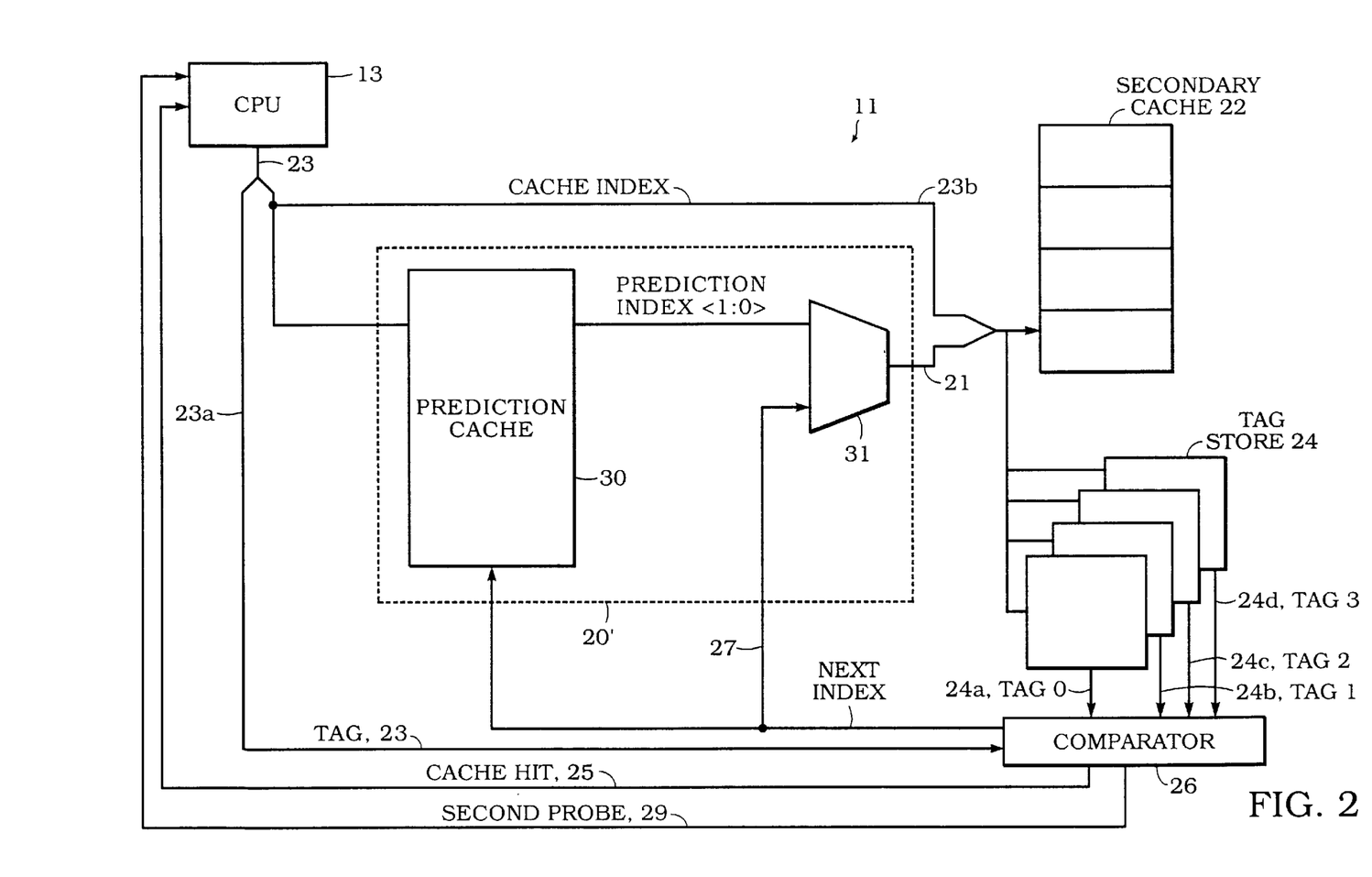
FIG. 2 illustrates one embodiment of the prediction logic incorporated in the cache sub-system of FIG. 1.

Referring now to FIG. 2, one embodiment of the prediction logic includes a set prediction cache 30 to provide the prediction index on line 21. The prediction index is used to select the appropriate pseudo-bank for the first cache access. Hence the number of bits comprising the prediction index is related to the number of pseudo banks in the secondary cache 22.

Prior to an access of the secondary cache 22, a portion of the memory address on line 23 is used to access the prediction cache 30. The prediction cache 30 is a random access memory which advantageously has more addressable locations than the secondary cache 22. The prediction cache 30 may be the same size as the secondary cache, and accordingly the cache index bits on line 23b would be used to access the prediction cache 30. However, using a prediction cache that is larger than the secondary cache increases the accuracy of the prediction because more bits of the memory address are used in accessing a larger prediction cache. The use of a larger prediction cache provides increased granularity between data in different pseudo-banks having the same cache index and accordingly an increased probability that the predicted pseudo-bank is the correct pseudo-bank.

When the prediction cache 30 is accessed, the prediction index 21 is appended to the cache index on line 23b to provide an address for the secondary cache 22. Although the secondary cache 22 is conceptually divided into a plurality of 'sets', physically it is one direct-mapped cache. Accordingly, the pseudo-bank number comprises the upper bits of the address of the secondary cache 22.

Generally set-associative cache memory systems use set numbers to access the different sets of the cache. The set numbers generally do not directly map to the address bits of the cache. Typically, in a set associative cache all of the sets are accessed using the cache index and a large multiplexer is required to select the desired set.

The present invention, which uses the prediction index to directly provide the upper address bits for the pseudo-bank, thus eliminates the requirement of decoding set numbers to determine the correct cache index. Further, by using a direct mapped cache where the prediction bits form part of the cache memory address, a multiplexer is not required because the correct pseudo-bank is predicted prior to the cache access. Given that caches are typically between 32 and 64 bits wide, it can readily be seen that, in terms of utilized gates and area, the savings due to the elimination of the multiplexer are considerable.

Providing a prediction index thus increases the probability of locating the correct cache data on the first access. However, depending on the size of the prediction cache relative to the size of the secondary cache, it is possible that the first probe may not retrieve the required data and there will be a 'miss' in the cache. A miss occurs when the tag on line 23a does not match the tag at the location of the tag store 24 corresponding to the predicted cache location. The miss status is inferred by the absence of the assertion of a 'CACHE HIT' signal on line 25 from the comparator 26 during a predetermined cycle in the secondary cache reference.

Figure 3:
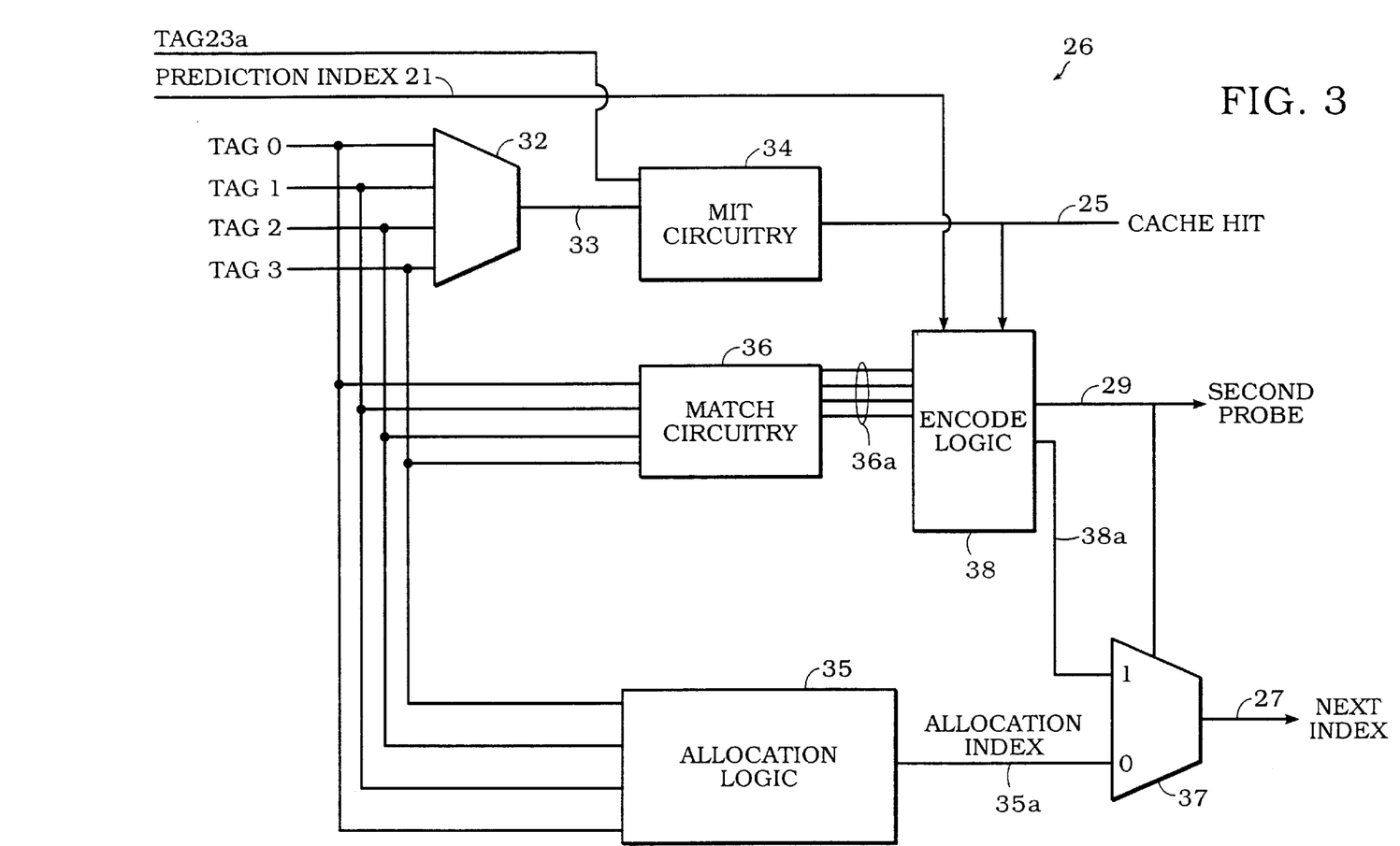
FIG. 3 illustrates a compare circuit for use in the prediction logic of FIG. 2.

Referring now to FIG. 3, one embodiment of the comparator 26 is shown to include a multiplexer 32 disposed to receive a plurality of tags (TAG0–TAG3 on lines 24a–24d) from the tag store 24 (FIG. 2). The select input of the multiplexer 32 is driven by the prediction index on line 21. The comparator 26 also includes a hit circuit 34 fed via the output of multiplexer 32 and the tag on line 23a. The hit circuit 34 compares the tag on line 23a against a tag on line 33 received from multiplexer 32 to provide the CACHE HIT signal on line 25.

The comparator 26 additionally includes match circuit 36 coupled to receive as inputs TAG0–TAG3 on lines 24a–24d and to provide an output to an encoder 38. The encoder provides two outputs; a signal SECOND PROBE on line 29, and a SECOND INDEX on line 38a. The SECOND PROBE signal on line 29 is transmitted to the CPU 13. The SECOND INDEX on line 38a is input to multiplexer 37.

The comparator 26 also includes allocation logic 35 coupled to receive the tag inputs on lines 24a–24d and provide an ALLOCATION INDEX on line 35a to multiplexer 37. The selection of either the ALLOCATION INDEX on line 35a and the SECOND INDEX on line 38a is controlled by the SECOND PROBE signal on line 29, and a signal NEXT INDEX is returned to the multiplexer 31 or the prediction logic 20 (FIG. 2).

During the secondary cache access, each sub-store of the tag store 24 is accessed using the cache index on line 23b. The four tags TAG0–TAG3 on lines 24a–24d are provided to the data input pins of the multiplexer 32 and the prediction index provided on line 21 is provided to the select pins of multiplexer 32. The tag corresponding to the present cache access is output on line 33, and compared against the tag on line 23a by hit circuit 34. If there is a match, the 'CACHE HIT' signal on line 25 is asserted, indicating that the CPU received correct data from the secondary cache 22.

At the same time that the 'hit' status of the cache access is determined, each of the four tags TAG0–TAG3 are compared against the tag on line 23a by match circuit 36. A four bit bus 36a is provided to the encode logic 38, where asserted bits of bus 36a indicate that the corresponding tag matched the tag on line 23a.

There is a possibility that the predict index on line 21 may not provide the correct index for the first probe to the secondary cache even though the required data was in the cache. In such an event, there is a 'miss' for the first probe, but one bit of bus 36a is asserted indicating that the corresponding tag did match the tag on line 23a. The bus 36a is then encoded to provide the SECOND INDEX on line 38a. The absence of the CACHE HIT signal at the expected cycle in combination with a SECOND INDEX on line 38a results in the assertion of the SECOND PROBE signal on line 29. The assertion of the SECOND PROBE signal results in the SECOND INDEX on line 38a being selected as the output for multiplexer 37 to provide the NEXT INDEX signal on line 27.

The NEXT INDEX value on line 27 is stored in prediction cache 30 (FIG. 2) and bypassed as the index for the next probe via multiplexer 31 (FIG. 2) onto line 21. The encode logic 38 provides a SECOND PROBE signal to the CPU 13 (FIG. 1) and to multiplexer 31 (FIG. 2) on line 29 to signal the CPU 13 to perform a second probe to obtain the correct cache data.

If there is a 'miss' of the first probe, and no match between any of the tags TAG0-TAG3 and the tag on line 23a, then the data is not in the cache, and it must be obtained from main memory 14.

During the latency associated with memory access, it is determined which pseudo-bank will store the refill data returned from memory. This determination is accomplished by allocation logic 35.

Typically a valid bit is stored along with the tags in the tag store 24. Allocation logic 35 receives the tags TAG0–TAG3 on lines 24a–24d and checks the valid bits of the received tags to see if there are any invalid bits, which would represent tag locations corresponding to cache locations capable of storing write data. If any of the valid bits of the tags from the four sub-stores are not asserted, the pseudo-bank corresponding to the sub-store location with an unasserted valid bit is selected as the pseudo-bank to be used to store the refill data from memory. The allocation then provides the selected pseudo-bank index as the ALLOCATION INDEX on line 35a which is selected by multiplexer 37 to provide the signal NEXT INDEX on line 27. The NEXT INDEX signal is then stored in the location of the prediction cache 30 corresponding to the address of the refill data.

If all the valid bits from the four sub-stores are asserted, valid data in one of the pseudo-banks must be replaced with the memory refill data. There are many different algorithms for use in deciding where to store the returned memory data, and a detailed description of all of the available methods is beyond the scope of this invention. However, by way of example, one method which is used to select data to be overwritten is the least recently used algorithm.

In a least recently used algorithm, an indication of when the data at each location has been last accessed, either for a read or a write, may be stored along with the tags in the tag store 24. When it has been determined that all of the data is valid, the access indication of the four sub-store tags is compared to identify the pseudo-bank with the least recent access at that cache index. The pseudo-bank which has the least recent access at the cache index is selected as the location for storing the refill data from memory 14. The selected pseudo-bank number is provided by the allocation logic 35 as the signal NEXT INDEX on line 27, and stored in the prediction cache 30.

The compare circuitry 26 thus allows for the determination of a first probe hit, a second probe hit or a cache miss using only one tag store access. Such an arrangement provides improved performance over similar caching systems which require multiple probes to determine whether or not the required data is actually in the cache.

Figure 4:
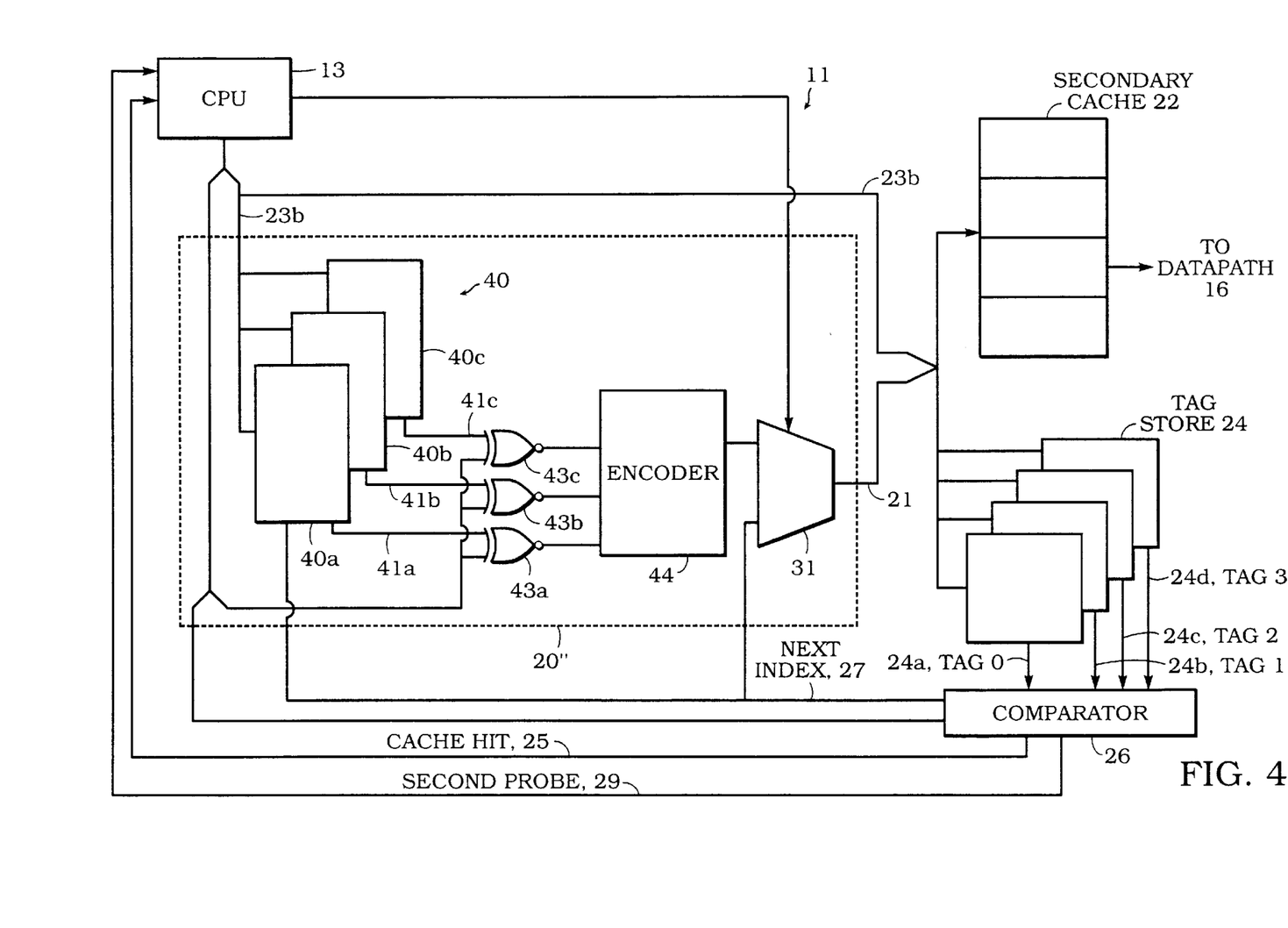
FIG. 4 illustrates a second embodiment of the prediction logic incorporated in the cache sub-system of is FIG. 1.

Referring now to FIG. 4, an alternate embodiment 20'' of the prediction logic 20 (FIG. 1) is shown to include a partial tag store 40 in place of the prediction cache 30 of FIG. 2. The partial tag store 40 is here shown to include 3 sub-stores 40a–40c. Each sub-store 40a–40c stores a subset of the tag bits of the data in the related pseudo-bank of the secondary cache 22. By providing only N–1 tag stores for N pseudo-banks of secondary cache, the area required for storing partial tags is reduced. The pseudo-bank which does not have a corresponding partial tag sub-store is used as the default pseudo-bank for the first probe as described below.

The number of address bits stored as the partial tag is generally dependent upon the amount of area available on the central processor chip and the timing constraints of the cache access path. During the access of secondary cache 22, the partial tag stores 40a–40c are addressed using the cache index on line 23b. Each of the partial tag sub-stores 40a–40c provides a tag having a predetermined number of bits on lines 41a–41c. The partial tags are compared by comparators 43a–43c against the corresponding bits of the memory address on line 23a to determine if any of the partial tags match the memory bits of the required data. If there is a match, a '1' value is passed from one of the comparators to the encoder circuit 44.

The encoder then provides the prediction index dependent on which partial tag sub-store provided the matching partial tag. The prediction index is the pseudo-bank number corresponding to the partial tag sub-store with the matching partial tag. If none of the partial tag sub-stores provide a matching partial tag, the default pseudo-bank is selected as the prediction index, and the prediction index is appended to the upper bits of the cache index to provide the full cache address for access of the secondary cache 22.

In the event that two or more partial tags match the tag on line 23a, a variety of algorithms may be used to select one of the tags for the first probe. One good algorithm would be to select the partial tag that corresponds to the data which was most recently accessed. To provide such a solution, a timing indication of when the data at the location corresponding to the partial tag was last accessed would be saved with the partial tags in the partial tag store 40. Such an arrangement is a modification of the least recently used algorithm discussed previously, the implementation of which is well known to one of ordinary skill in the art.

In the event that there is a 'miss', the least recently used algorithm is used to allocate data into one of the plurality of pseudo-banks. When the appropriate pseudo-bank is selected, the corresponding partial tag store is updated with a subset of the tag on line 23a.

While the above embodiment described prediction logic having fewer partial tag sub-stores than pseudo-banks, it is to be understood that advantages may also be gained by having the number of partial tag sub-stores equivalent to the number of pseudo-banks. Increasing the number of partial tag sub-stores to equal the number of pseudo-banks directly increases the area used on the central processor board. However, it allows for an increase in performance by providing indication of a 'miss' in the secondary cache before any secondary cache access or tag store access has been completed. The above described arrangement thus provides flexibility depending on whether reduced area or increased performance is important to the design.

Figure 5:
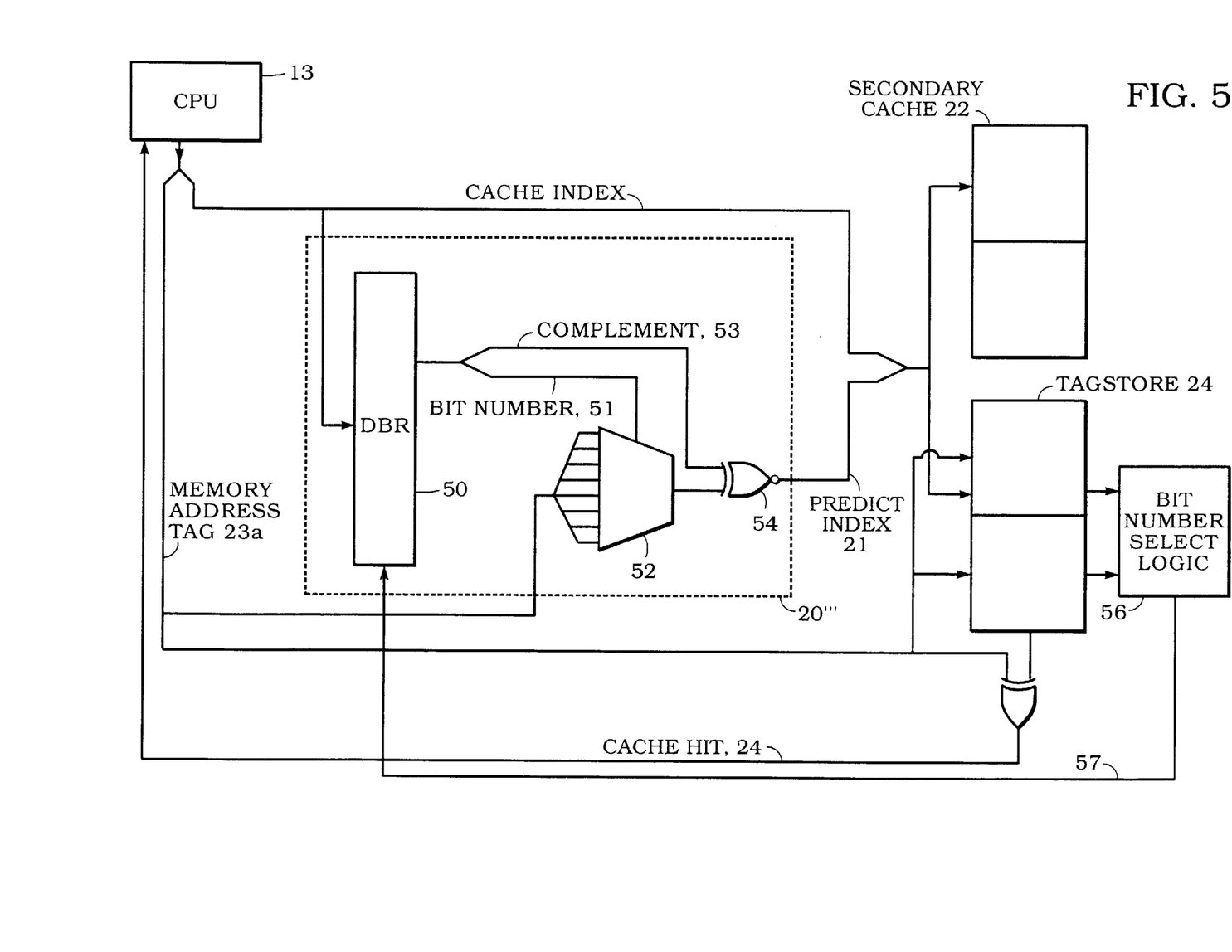
FIG. 5 illustrates a third embodiment of the prediction logic incorporated in the cache sub-system of FIG. 1.

Referring now to FIG. 5, a further alternate embodiment of the prediction logic 20''' is shown to include a Distinguishing Bit RAM (DBR) 50 coupled to provide a select on line 51 to a multiplexer 52, and a COMPLEMENT signal on line 53 to Exclusive Or gate 54 to provide a 1 bit prediction index on line 21 for accessing the secondary cache 22. Bit number select logic 56 is coupled to the DBR 50 to provide the bit number which is stored in the DBR. It should be noted that this embodiment is most effective where there are two pseudo-banks in the secondary cache 22, for example pseudo-bank-0 and pseudo-bank-1.

As described previously, the tag store 24 is allocated such that there is a separate sub-store corresponding to each pseudo-bank of the secondary cache 22. The distinguishing bit RAM 50 stores a bit number for each location of the tag sub-store. The bit number stored in the DBR is any bit number at which the tag in the substore corresponding to pseudo-bank-0 differs from the tag in the sub-store corresponding to the pseudo-bank-1. The bit number is determined by the bit number select logic 56 during allocation of the data into the secondary cache.

Because the bit number is ANY bit number at which the two tags differ, a variety of methods may be used by the bit number select logic 56 to select a bit number to be stored in the DBR. For example, logic which exclusively OR's the two tags and priority encodes the result to select the bit number of the least significant bit which is asserted may easily be implemented by one of ordinary skill in the art to provide a differing bit number.

A COMPLEMENT value is stored along with the distinguishing bit number in each location of the Distinguishing Bit RAM 50. The COMPLEMENT value is used to indicate whether or not the value of the tag bit at the bit number provided by the DBR is directly related to the pseudo-bank number.

For example, a cache sub-system may have two tag sub-stores, each having four bit tags. The binary value of the tag in the sub-store corresponding to pseudo-bank-0 is 1110 and the binary value of the tag in the sub-store corresponding to pseudo-bank-1 is 1000. Also assume a selection algorithm which compares the two tags and provides the bit number of the least significant bit which differs between the two tags. Assuming there are four bit locations (bit 0 through bit 3) the differing bit number of the two tags described above is bit number 1. The value of the bit at bit number 1 is logical '1' for the tag corresponding to pseudo-bank 0 and logical '0' for the tag corresponding to pseudo-bank 1. Therefore the value of the bit at the bit number cannot alone be used as the prediction index to be appended to the cache index, since an incorrect pseudo-bank would be selected. Thus a COMPLEMENT value of '1' is stored when the value of the bit at the bit number is inversely related to the pseudo-bank number. Consequently a COMPLEMENT value of '0' is stored when the value of the bit at the bit number is directly related to the pseudo-bank number.

On each access of secondary cache 22, the DBR 50 provides the bit number on line 51. The bit number is used to select one of the bits of the memory address tag on line 23a. The selected memory bit is then inverted in response to the COMPLEMENT signal on line 53 by EXOR gate 54 to provide the prediction index on line 21.

The above described arrangement has the advantage that the desired location in the secondary cache is always accessed on the first probe. This is apparent since it is clear that the tag bit of the other pseudo-bank does not equal the related bit of the memory address. Therefore, if the data is in the secondary cache 22, it is guaranteed that it will be found on the first probe.

However, because only two pseudo-banks of data are provided, there is the potential that the required data is not in the secondary cache, thereby resulting in a 'miss'. In such an event, the memory data is fetched from memory 14 (FIG. 1), while the memory address tag is written to one of the tag sub-store locations. Deciding which sub-store location (and correspondingly the pseudo-bank) to store the memory data in may be decided by either a least recently used algorithm or other algorithms well known to one of skill in the art.

During the access of memory 14, the new memory tag stored in the selected tag sub-store is compared against the existing tag in the other sub-store by the bit number select logic 56. The bit number select logic 56 selects a bit number at which the two tags differ, and determines whether or not the bit value of the tag is proportionally related to the pseudo-bank number of the tags. The bit number and the COMPLEMENT value are provided on line 57 to the DBR 50 and written at the cache index provided on line 23b.

The above described Distinguishing Bit RAM embodiment of the invention thus provides an efficient mechanism by which a direct-mapped secondary cache may have set-associative attributes without the increased hardware complexity and timing delays normally associated with set-associative caches.

Having described a preferred embodiment of the invention, it will now become apparent to one of skill in the art that other embodiments incorporating its concepts may be used. It is felt, therefore, that this embodiment should not be limited to the disclosed embodiment, but rather should be limited only by the spirit and scope of the appended claims.

What we claim is:

1. An apparatus comprising:

a memory subsystem comprising:

a first memory having a plurality of locations for storing data, said first memory being partitioned into a plurality of banks, with each bank being addressable by a first index, with said first index being comprised of a portion of bits of an address to address the memory subsystem;

prediction means, responsive to said first index, for providing a prediction index related to the number of banks in said first memory, and wherein said prediction index is appended to said first index to form a prediction address for accessing required data in said first one of said plurality of banks in said first memory;

a tag store, coupled to said prediction means; and means for initiating a second access of said banks of said first memory using a second address for retrieving said required data from another location of said first memory in the event that a tag, stored in said tag store and corresponding to said prediction address, does not match an upper portion of said address to address said memory subsystem.

2. The apparatus of claim 1, wherein said prediction means further comprises a prediction store for storing a plurality of prediction indexes, wherein a value of said prediction index is indicative of the bank of said first memory which stores data having a given first index.

3. The apparatus of claim 2, wherein said tag store is further coupled to a first address bus and said tag store further comprises:

a plurality of sub-stores corresponding to said plurality of banks of said first memory, each of said sub-stores having a plurality of locations related to said plurality of locations in said corresponding bank, wherein each of said sub-stores stores a tag comprising an upper address portion of an address of the data at the corresponding location of said corresponding bank of said first memory;

means for comparing the tag at said prediction address of said tag store against said upper address portion of the address on said first address bus to determine if the data provided by said first memory is the required data; and means for updating said prediction index at said location of said prediction store corresponding to said first index in the event that the tag stored at said prediction address of said tag store does not match the upper portion of the address on said bus.

4. The apparatus according to claim 3, wherein said means for retrieving further comprises:

matching means for comparing each of the tags from said plurality of sub-stores against said upper address portion of the address on said first address bus to determine a match;

means for providing an updated prediction index corresponding to the sub-store having a tag which matches said upper portion of the address on said bus; and means for appending said updated prediction index to said first index to provide a second prediction address for accessing said first memory.

5. The apparatus of claim 4 further comprising:

a second memory, larger and slower than said first memory, coupled to said first memory;

means for retrieving data from said second memory to store in said first memory in the event that none of said tags from said plurality of sub-stores match said upper bits of the address on said bus;

means for selecting one of said plurality of banks of said first memory for storing said retrieved data at said first index; and means for providing an updated prediction index related to said selected plurality of banks including means for storing said updated prediction index at a location of said prediction store corresponding to said first index.

6. The apparatus of claim 1, wherein said prediction means further comprises:

a partial tag store, comprising a plurality of partial sub-stores, each for storing a partial tag, wherein each of said sub-stores has a plurality of locations related to said plurality of locations of each of said banks of said first memory, wherein each of said partial tags comprise a portion of the address bits of the data stored at the corresponding location of said corresponding bank of first memory;

means for addressing said partial sub-stores with said first index to provide a corresponding plurality of partial tags;

means for comparing said plurality of partial tags against corresponding bits of the address on said first address bus to determine a match; and means for providing a prediction index responsive to a match indication from said means for comparing.

7. The apparatus of claim 6 wherein there is one fewer sub-store than there are banks in said first memory, further comprising means for providing a default prediction index in the event that none of the plurality of partial tags match the corresponding bits of the address on said first address bus.

8. The apparatus of claim 1, wherein said first memory is partitioned into two banks, further comprising:

a tag store comprising two sub-stores, each of said sub-stores accessed by said first index and comprising a plurality of locations related to the plurality of locations in said corresponding bank, wherein each location of said sub-store stores a tag, said tag comprising the upper address bits of said data stored at the corresponding location in said corresponding bank;

a distinguishing bit store comprising a plurality of locations corresponding to the plurality of locations of said sub-store, wherein each location of said distinguishing bit store stores a bit number and a complement value, wherein said bit number indicates a bit number of said tags in said corresponding locations of said sub-stores wherein the values of the bits at said bit number of said tags being logically unequal; and wherein said complement value is responsive to the value of the bit at said bit number of said tag stores and to the bank number at which said data is stored.

9. A method comprising the steps of:

providing a bus for communication of addresses and data;

coupling a first memory to said bus;

partitioning said first memory into a plurality of banks, each of said plurality of banks having a plurality of locations;

providing a prediction index responsive to a lower portion of an address on said bus, said prediction index indicative of a predicted bank;

appending said prediction index to said lower portion of said address on said bus to provide a prediction address for accessing said first memory; and providing a second prediction index responsive to said lower portion of said address on said bus in the event that said access of said first memory results in a miss, said second prediction index indicative of a second predicted bank.

10. The method according to step 9 wherein said step of providing a prediction index further comprises the steps of:

providing a second memory coupled to said first memory and said bus;

when data is stored in a location in said bank of memory, storing a bank number related to said stored location in a corresponding location of said second memory; and when data is required from said first memory, accessing said second memory to provide said stored bank number as said prediction index.

11. The method according to claim 9, wherein said step of providing a prediction index further comprises the steps of:

providing a plurality of storage devices, coupled to said bus and said first memory, said storage devices for storing a portion of the address on said bus when data is written to a related location of said first memory; and when data is required from said first memory, comparing the stored portion of said address from each of said plurality of storage devices against a corresponding portion of said address on said bus to determine a match between once of said plurality of storage devices and the portion of said address on said bus; and providing a prediction index responsive to a match from one of said plurality of storage devices.

12. The method according to claim 9, wherein said first memory is divided into two banks and wherein said step of providing a prediction index further comprises the steps of:

providing a second memory coupled to said bus, said second memory comprising a plurality of locations related to said plurality of locations of said first memory, said second memory partitioned into two banks corresponding to said banks of said first memory, said second memory for storing an upper address portion of the data at said corresponding location of said first memory;

providing a third memory, coupled to said first memory and said bus, said third memory comprising a plurality of locations corresponding to the plurality of locations in one of said banks of said second memory, each of said locations of said third memory for storing a bit number and a complement value, wherein said bit number is indicative of a bit number of said data stored in a location of second memory, wherein said bit value of said data stored at said location is logically unequal to the value of the bit at said location in the other bank; and wherein said complement value is responsive to the value of the bit at said bit number at said location and to the bank number of said first memory where a required data item is stored.

* * * * *